Figure 1:
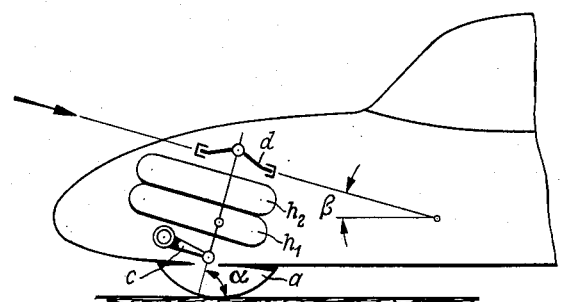

2,749,142

WHEEL SUSPENSION OF THE SWINGING-ARM TYPE WITH FAVORABLE SPATIAL ARRANGEMENTS, ESPECIALLY FOR MOTOR VEHICLES

Béla Barényi, Stuttgart-Rohr, Germany

Application July 6, 1951, Serial No. 235,486
In Germany January 22, 1949

Public Law 619, August 23, 1954
Patent expires January 22, 1969

5 Claims. (Cl. 280—124)

The present invention relates to a wheel suspension in automotive vehicles and particularly to independent suspension systems of the swinging arm type.

In most of the independent wheel suspension systems of the convention type, the wheels are supported on two substantially parallel control members pivoting either about axes which are disposed longitudinally or substantially longitudinally relative to the vehicle so that the control members swing in planes substantially transverse relative to the vehicle, or on axes which are disposed transversely or substantially transversely relative to the vehicle so that the control members swing in planes substantially longitudinal relative to the vehicle. In the first case the transversely swinging control members require a comparatively large portion of the transverse cross sectional area of the vehicle and the available space for other purposes, for instance, for mounting the engine or other parts is comparatively small and—due to the arrangement of the parts of the suspension system—of a shape unfavourable for mounting the engine or other parts. On the other hand, longitudinally swinging control members cannot be used to advantage in many cases as mounting the control members one above the other requires additional frame reinforcements, especially if, in order to be better able to resist braking torque, the control members are mounted forward of the wheel knuckles. An additional disadvantages of this type of wheel suspension is that it is comparatively difficult to utilize leaf springs as control arms or leaf springs which resiliently support both wheels.

According to the present invention the disadvantages inherent in the two above referred to parallel arm suspension systems are avoided by arranging one of the control members—which can, for instance, consist of two control arms or a leaf spring—in such a way as to swing about an axis extending substantially lengthwise of the vehicle and the other control member in such a way as to swing about an axis extending substantially transversely to the vehicle. It will be found expedient to have the upper control member swing about an axis extending lengthwise of the vehicle. This upper member can, for instance, be a leaf spring serving both steering knuckles whereas the lower lengthwise swinging control member preferably consists of two control arms which, for instance, may be connected to each other by means of a torsion bar or the like.

The main advantage of a wheel suspension system according to the present invention is that more of the transverse cross sectional vehicle area in the plane of the transversely swinging control member or members is—depending on the arrangement of these members in the vehicle—available either above or below these members for mounting or storing essential mechanisms or accessories, only a comparatively small portion of this transverse cross sectional area being required for the longitudinally swinging control members which can be mounted relatively close to the wheels and can be securely supported on the frame or the like.

In one embodiment of the invention a transversely swinging leaf spring may be used as one of the control members for both wheels and a suitable torsion bar or stabilizer, which takes up very little space and improves the stability of the vehicle when going around turns, may be connected between the two longitudinally swinging control arms.

It will be found expedient to mount the upper control member or members as high above the road surface as possible, for instance, immediately underneath the top body panel, and the lower control member or members relatively close to the lower body panel in order to obtain between the upper and lower members as large a space as possible for mounting or storing essential parts or accessories of the vehicle.

In order to more resiliently cushion impacts imparted to the wheels by road obstructions it will be found expedient in most cases to mount the control members on the frame or body in such a way that the steering knuckle supports are inclined towards the rear of the car.

Figure 2:
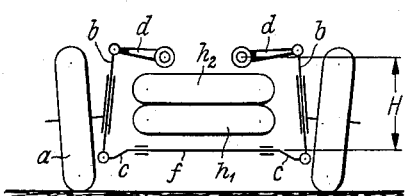
Figure 3:
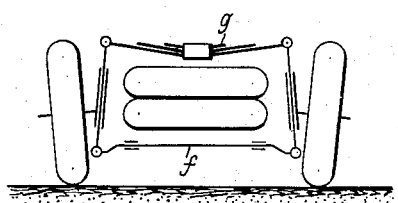

Several embodiments of the invention are shown in the accompanying drawings of which Fig. 1 is a schematic longitudinal sectional view of the front portion of a vehicle, Fig. 2 is a schematic front view of the wheel suspension system of the vehicle shown in Fig. 1 viewed in the direction of the arrow shown in Fig. 1, and Fig. 3 is a schematic front view of a modified wheel suspension similar to the arrangement shown in Fig. 2.

The steering knuckle support $b$ of the front wheels $a$ are supported by control arms $c$ and $d$ which are pivotally mounted on the frame or on parts connected thereto, the lower control arms $c$ being mounted so as to swing longitudinally of the vehicle and the upper control arms $d$ being mounted so as to swing transversely to the vehicle. The axes of the upper control arms are inclined at an angle $\beta$ relative to the horizontal and the lower arms are similarly inclined with the result that in the normal position of the vehicle the steering knuckle supports $b$ are inclined to the rear at an angle $\alpha$. As the steering knuckle supports are swinging in a plane substantially corresponding to this angle $\alpha$, road shocks and jars acting longitudinally to the vehicle can be cushioned more effectively by the front spring means which, for instance, may be leaf, coil or torsion bar springs.

In the embodiment shown in Figs. 1 and 2 the lower control arms $c$ are connected to a torsion spring $f$ whose resistance to torsional stress increases if the wheels swing in opposite directions, i. e., one wheel swinging upwardly while the other one swings downwardly. A simultaneous up- or down-movement of both wheels can be cushioned by additional spring means, for instance, by a leaf spring $g$ replacing the upper control arms, which leaf spring $g$ is fixedly secured to the frame in the central region thereof, as indicated in Fig. 3.

The upper transversely swinging control arms $d$ or the leaf spring $g$ should be arranged as high as possible above the road surface so that the space below them can be more efficiently utilized for other purposes than wheel suspension. The lower longitudinally swinging control arms $c$ which are preferably mounted on the frames forward of the axes of the front wheels are—with the car in its normal position—preferably so disposed as to slant downwardly in a direction parallel to the axes of the upper control arms.

By reason of the relatively high arrangement of the control arms $d$, useful space is made available which may be used, for example, for the storage of two spare tires $h_1$ and $h_2$. The distance indicated in Figure 2 by reference character H shows the relatively large spacing between the axis of the control arm *d* and the torsion bar *f*. As appears clearly from Figure 2, this distance H is larger than twice the width of the spare wheels provided with the tires $h_1$ and $h_2$ which are similar to the wheels *a*. The upper control member *d* is spaced from the wheel axis at a distance substantially larger than the distance between the lower control member *c* and the wheel axis.

The invention is not limited to front wheel suspension but pertains to wheel suspension in general.

What I claim is:

1. In a wheel suspension system for a vehicle of the swinging arm type in combination a wheel knuckle, two control members disposed one above and the other below said wheel knuckle, wheel knuckle supports suspended on said two control members, means for connecting one of said control members for swinging movement about an axis extending substantially lengthwise relative to the vehicle and for connecting the other one of said control members for swinging movement about an axis extending substantially transversely relative to the vehicle, and means for swingingly connecting said wheel knuckle supports to said control members, the upper one of said control members being mounted above the wheel axis and the lower one of said control members below the wheel axis, said upper and lower control members being spaced at a distance larger than twice the width of the vehicle wheel, the distance between the upper control member and the wheel axis being substantially larger than the distance between the lower control member and the wheel axis.

2. In a wheel suspension system for a vehicle of the swinging arm type in combination a wheel knuckle, two control members disposed one above and the other below said wheel knuckle, wheel knuckle supports suspended on said two control members, means for connecting one of said control members for swinging movement about an axis extending substantially lengthwise relative to the vehicle and for connecting the other one of said control members for swinging movement about an axis extending substantially transversely relative to the vehicle, and means for swingingly connecting said wheel knuckle supports to said control members, corresponding swinging axes of each control member being substantially parallel with each other, the upper one of said control members being mounted above the wheel axis and the lower one of said control members below the wheel axis, said upper and lower control members being spaced at a distance larger than twice the width of a vehicle wheel, the distance between the upper control member and the wheel axis being substantially larger than the distance between the lower control member and the wheel axis.

3. In a wheel suspension system for a vehicle of the swinging arm type in combination a wheel knuckle, two control members disposed one above and the other below said wheel knuckle, wheel knuckle supports suspended on said two control members, means for connecting one of said control members for swinging movement about an axis extending substantially lengthwise relative to the vehicle and for connecting the other one of said control members for swinging movement about an axis extending substantially transversely relative to the vehicle, and means for swingingly connecting said wheel knuckle supports to said control members, the upper one of said control members being mounted above the wheel axis and the lower one of said control members below the wheel axis, said upper and lower control members being spaced at a distance larger than twice the width of a vehicle wheel, the distance between the upper control member and the wheel axis being substantially larger than the distance between the lower control member and the wheel axis, the upper control member being formed by a transversely mounted leaf spring fixedly mounted in a transverse plane of the vehicle and serving both wheels, and the lower control member consisting of two control arms swinging about axes disposed transversely relative to the vehicle.

4. In a wheel suspension system for a vehicle of the swinging arm type in combination a wheel knuckle, two control members disposed one above and the other below said wheel knuckle, wheel knuckle supports suspended on said two control members, means for connecting one of said control members for swinging movement about an axis extending substantially lengthwise relative to the vehicle and for connecting the other one of said control members for swinging movement about an axis extending substantially transversely relative to the vehicle, and means for swingingly connecting said wheel knuckle supports to said control members, the upper one of said control members being mounted above the wheel axis and the lower one of said control members below the wheel axis, said upper and lower control members being spaced at a distance larger than twice the width of a vehicle wheel, the distance between the upper control member and the wheel axis being substantially larger than the distance between the lower control member and the wheel axis, the swinging axes in each of the wheel knuckle supports relating to one of the control members being inclined similarly toward the rear in the longitudinal direction of the vehicle, and the wheel knuckle supports, arranged to move substantially in a vertical plane, being swingable in a direction approximately perpendicular to the first-mentioned axes.

5. In a wheel suspension system for a vehicle of the swinging arm type in combination a wheel knuckle, two control members disposed one above and the other below said wheel knuckle, wheel knuckle supports suspended on said two control members, means for connecting one of said control members for swinging movement about an axis extending substantially lengthwise relative to the vehicle and for connecting the other one of said control members for swinging movement about an axis extending substantially transversely relative to the vehicle, and means for swingingly connecting said wheel knuckle supports to said control members, the upper one of said control members being mounted above the wheel axis and the lower one of said control members below the wheel axis, said upper and lower control members being spaced at a distance larger than twice the width of a vehicle wheel, the distance between the upper control member and the wheel axis being substantially larger than the distance between the lower control member and the wheel axis, the upper control member swinging substantially transversely relative to the vehicle and consisting of two pivotally supported control arms.

References Cited in the file of this patent

UNITED STATES PATENTS

| | | |
|---|---|---|
| 2,094,824 | Sanford | Oct. 5, 1937 |
| 2,164,470 | Opolo | July 4, 1939 |
| 2,220,916 | Schiff | Nov. 12, 1940 |
| 2,517,611 | Utz | Aug. 8, 1950 |

FOREIGN PATENTS

| | | |
|---|---|---|
| 492,771 | Great Britain | Sept. 27, 1938 |